United States Patent [19]

Igashira et al.

[11] Patent Number: 4,610,427
[45] Date of Patent: Sep. 9, 1986

[54] PIEZOELECTRIC CONTROL VALVE FOR FUEL INJECTOR OF INTERNAL COMBUSTION ENGINE

[75] Inventors: Toshihiko Igashira, Toyokawa; Yasuyuki Sakakibara, Nishio; Toru Yoshinaga; Seiko Abe, both of Okazaki; Yukihiro Natsuyama, Anjo, all of Japan

[73] Assignee: Nippon Soken, Inc., Nishio, Japan

[21] Appl. No.: 723,896

[22] Filed: Apr. 16, 1985

[30] Foreign Application Priority Data

Apr. 17, 1984 [JP] Japan ................................. 59-75798
Nov. 13, 1984 [JP] Japan ................................. 59-239664
Jan. 10, 1985 [JP] Japan ................................. 60-2769

[51] Int. Cl.⁴ ............................................. F16K 31/02
[52] U.S. Cl. ............................................. 251/129.06
[58] Field of Search ................................. 251/129.06

[56] References Cited

U.S. PATENT DOCUMENTS 4,535,743 8/1985 Igashira et al. ...................... 123/472

Primary Examiner—Gerald A. Michalsky
Attorney, Agent, or Firm—Cushman, Darby & Cushman

[57] ABSTRACT

Disclosed is a piezoelectric control valve which is arranged midway in a passage for supplying a high-pressure fuel to a fuel injection valve, and opens and closes this passage according to expansion and contraction of a piezoelectric element laminate. The valve body of the piezoelectric control valve is slidably held in a bore into which a high-pressure fuel passage connected to the fuel injection valve and a low-pressure fuel passage communicating with a fuel storage portion are opened. An annular groove is formed on the peripheral surface of the valve body, and the high-pressure fuel passage and the low-pressure fuel passage can communicate with each other through this annular groove. A piston moving reciprocatively according to expansion and contraction of the piezoelectric element laminate is provided, and a pressure chamber is formed between the piston and the valve body. The pressure in the pressure chamber is increased and decreased by the reciprocative movement of the piston, and by this increase and decrease of the pressure in the pressure chamber, the valve body is moved to connect the high-pressure fuel passage and the low-pressure passage to each other or to disconnect these passages from each other.

17 Claims, 14 Drawing Figures

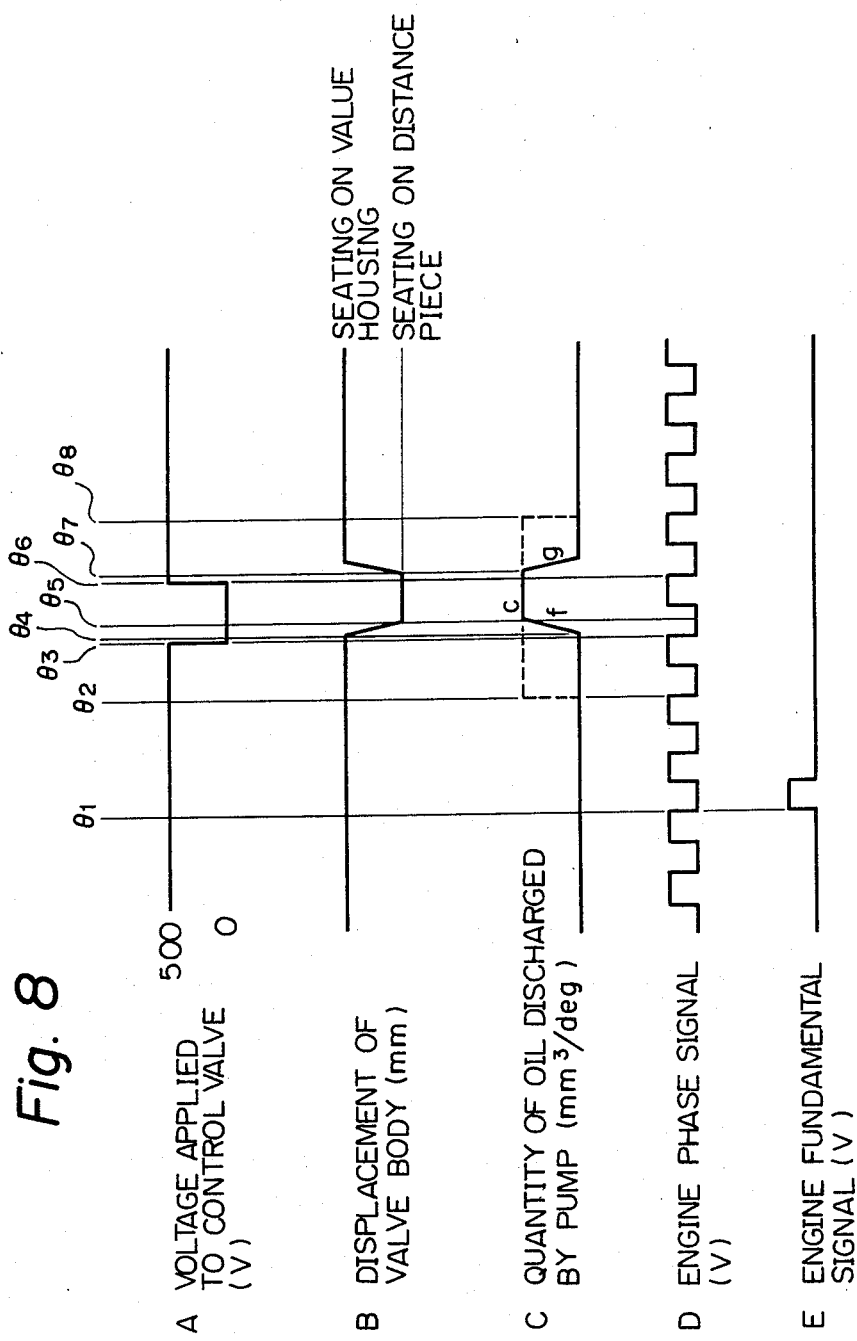

4,610,427

PIEZOELECTRIC CONTROL VALVE FOR FUEL INJECTOR OF INTERNAL COMBUSTION ENGINE

BACKGROUND OF THE INVENTION

1. Field of the Invention

The present invention relates to an piezoelectric control valve to be used for a fuel injector of an internal combustion engine. More particularly, it relates to a fuel injector for a diesel engine.

2. Description of the Related Art

In an attempt to increase the degree of freedom for the injection of a fuel, this fuel injection is often electronically controlled. However, when electronic control is used for injecting fuel in a diesel engine, a larger size control valve must be used to cope with the high fuel pressures involved, and thus the response characteristic becomes limited. Accordingly, in the conventional control valve, control of the time for starting the injection of a fuel is very difficult, and the degree of freedom of the control is very low. Accordingly, even pilot injection by controlling the injection rate is difficult, and a sufficient improvement cannot be attained in the reduction of engine noise or in the emission of exhaust gas.

SUMMARY OF THE INVENTION

Therefore, a primary object of the present invention is to provide an electronic control valve in which the size is diminished, the response characteristic is improved, the timings for starting and terminating the injection of a fuel are accurately controlled, and pilot injection is made possible.

Another object of the present invention is to provide an electronic control valve which can be driven without using an external power source.

In accordance with the present invention, there is provided a piezoelectric control valve for a fuel injector, which comprises a high-pressure fuel passage communicating with an external mechanism for ejecting a high-pressure fuel, a low-pressure fuel passage communicating with an external storage portion for holding a low-pressure fuel therein, a housing having a bore into which the fuel passages are opened, a valve body slidably arranged within the bore of the housing to connect the high-pressure fuel passage and the low-pressure fuel passage to each other, or to disconnect the fuel passages from each other, a piezoelectric element laminate which expands and contracts-according to the voltage applied, and a piston which is reciprocatively moved according to the expansion and contraction of the piezoelectric element laminate to change the pressure within a pressure chamber formed between the piston and the valve body. The valve body is moved forward and backward, according to the pressure difference between pressure-receiving surfaces on which the pressure within the pressure chamber is applied, to connect or disconnect the high-pressure fuel passage and the low-pressure fuel passage.

BRIEF DESCRIPTION OF THE DRAWINGS

The present invention will be better understood from the ensuing description made, by way of example, of the embodiments according to the present invention with reference to the accompanying drawings, wherein:

FIG. 8 is a graph showing the operation in the sixth embodiment;

DESCRIPTION OF THE PREFERRED EMBODIMENTS

The present invention will now be described in detail with reference to the embodiments illustrated in the accompanying drawings.

Figure 1:
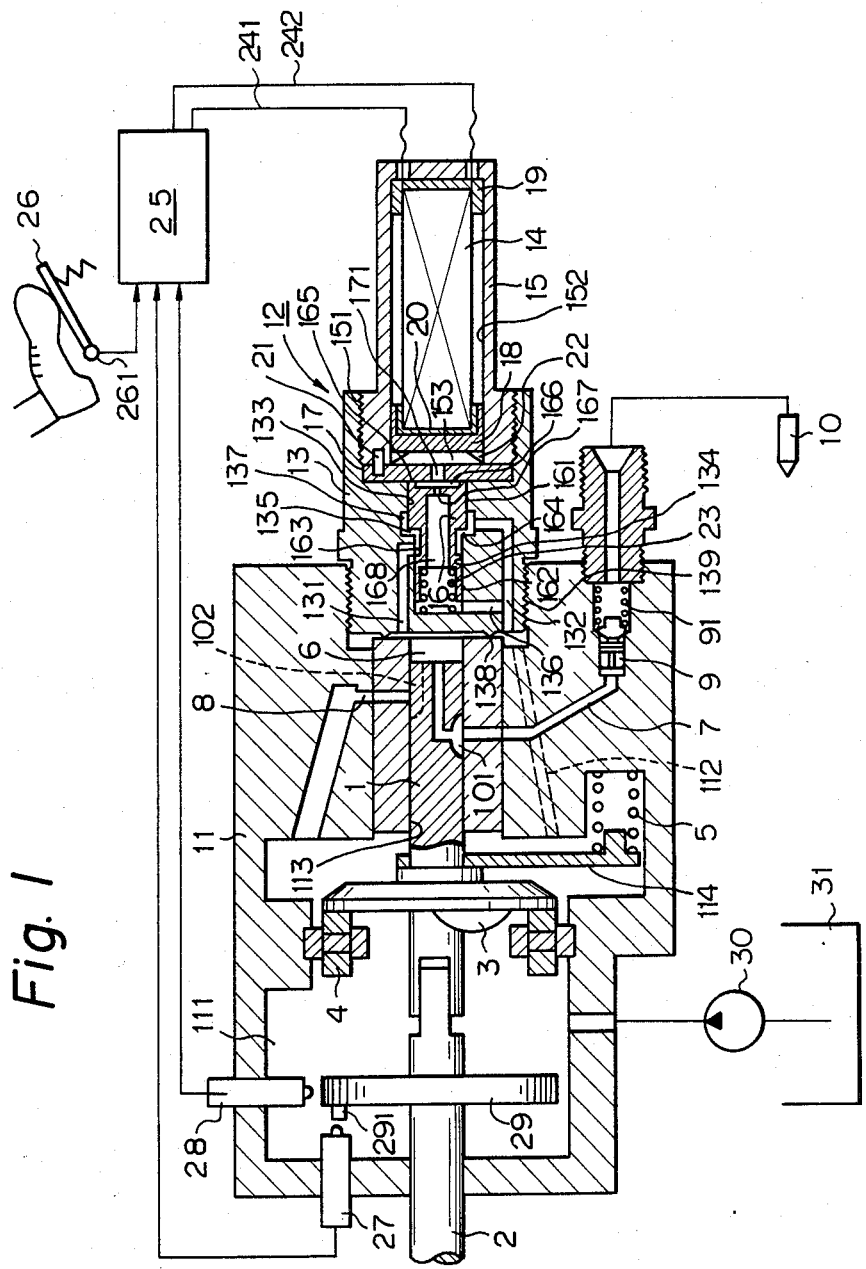
FIG. 1 is a sectional view showing a fuel injection pump to which a control valve of a first embodiment of the present invention is adapted.

FIG. 1 shows the structure of a known distribution type fuel injection pump of the Bosch system to which a piezoelectric control valve according to the first embodiment of the present invention is adapted and from which the conventional timer mechanism for changing the injection time is removed.

In the above conventional system, a plunger 1 slidably supported within a cylinder bore 113 of a pump casing 11 is rotated synchronously with and at a rotation speed one half that of an engine and is also reciprocatively moved. Namely, the rotation of the engine is transmitted to a driving shaft 2 through a gear or timing belt and the plunger 1 is rotated and driven coaxially with the driving shaft 2. The plunger 1 is reciprocatively moved in the direction of the axis by the engagement with a roller 4 of a face cam 3 secured to the plunger 1. When engaged with the roller 4, the face cam 3 is always urged to the left in FIG. 1 by a spring 5 through a connecting member 114, is rotated axially by periodic engagement of the face cam 3 with the roller 4, whereby the plunger 1 is reciprocatively moved.

The same number of distribution ports 101 and suction ports 102 as there are engine cylinders are formed on the periphery of the plunger 1, and a pump chamber 6 is formed between the top end face of the plunger 1 and the cylinder bore 113. In the pump casing 11, there are formed a low pressure chamber 111, a suction passage 8 for connecting the low pressure chamber 111 to the cylinder bore 113, and distribution passages 7 for connecting respective external injection valves 10 to the cylinder bore 113. The number of distribution passages 7 arranged corresponds to the number of engine cylinders, and a delivery valve 9 is arranged midway in each distribution passage 7. The delivery valve 9 can be opened against a spring 91 and exerts the functions of both a check valve and a suction return valve.

When the plunger 1 moves to the left and the pump chamber 6 expands, any one of the suction ports 102 is made to communicate with the suction passage 8, and fuel in the low pressure chamber 111 is drawn into the pump chamber 6. When the plunger 1 moves to the right and the pump chamber 6 contracts, any one of the distribution ports 101 is made to communicate with one of the distribution passages 7 and the fuel in the pump chamber 6 is ejected to the outside.

In the present embodiment, a control valve 12 is provided to control the fuel pressure in the pump chamber 6.

The control valve 12 is arranged in an opening on the side opposite to the plunger 1 of the pump chamber 6, and comprises a valve housing 13, a piezoelectric element laminate 14, a casing 15, a valve body 16, a distance piece 17, and a piston 18.

The valve housing 13 includes a high-pressure fuel passage 131 communicating with the pump chamber 6, a low-pressure fuel passage 132 communicating with the low pressure chamber 111 through a passage 112 formed in the pump casing 11, and a cylinder bore into which the high-pressure fuel passage 131 and the low-pressure fuel passage 132 are opened. This cylinder bore comprises a first cylinder bore 133 having a large diameter and a second cylinder bore 134 having a small diameter, and a stepped seat surface 135 is formed between the first cylinder bore 133 and the second cylinder bore 134. The high-pressure fuel passage 131 is opened on the side of the seat surface 135 in the second cylinder bore 134 and the low-pressure fuel passage 132 is opened in an annular groove 137 formed in the vicinity of the seat surface 135 in the first cylinder bore 133. The second cylinder bore 134 on the side of the pump chamber 6 is blocked by the wall and the portion close to this wall is connected to the low-pressure fuel passage 132 through a passage 136 formed in the radial direction in the housing 13.

The valve body 16 comprises a large-diameter portion 161 and a small-diameter portion 162, and an annular groove 162 is formed on the peripheral surface of the small-diameter portion 162 on the side of the large-diameter portion 161. The large-diameter portion 161 is slidably fitted in the first cylinder bore 133 and the small-diameter portion 162 is slidably fitted in the second cylinder bore 134. The wall surface of the annular groove 163 on the side of the large-diameter portion 161 forms a first seat portion 164 that adheres closely to the seat surface 135, and the end face of the large-diameter portion 161 forms a second seat portion 169 that is anchored to the end face of the distance piece 17. A concave portion 166 is formed in the central part of the second seat portion 165. A passage 168 is formed through the axis of the valve body 16, and a throttle 167 is formed at an intermediate part of the passage 168 which adjoins the concave portion 166. A spring 23 is arranged within the second cylinder bore 134 and this spring 23 is inserted between the end face of the bore 134 and the step portion of the passage in the valve 16 to bias the valve body 16 to the right in the drawings. Accordingly, the valve body 16 is switched between the first position where the first seat portion 164 is seated on the seat surface 135 and the second position where the second seat portion 165 is seated on the distance piece 17. When the valve body 16 is located at the first position, the high-pressure fuel passage 131 is disconnected from the low-pressure fuel passage 132, and when the valve body 16 is located at the second position, the high-pressure fuel passage 131 is connected to the low-pressure fuel passage 132 through the annular grooves 163 and 137.

In the valve housing 13, which supports the valve body 16 in such a manner that the valve body 16 can be reciprocatively moved, an annular projection 138 having a triangular section, which is formed on the left end of the valve housing 13, is closely secured to the end face of the pump casing 11, and a peripheral screw portion 139 is screwed to the screw portion of the pump casing 11 to fix the valve housing 13 to the pump casing 11. Thus, leakage of the fuel in the pump chamber 6 to the outside along the end face of the pump casing 11 is prevented by the annular projection 138.

The casing 15 having the piezoelectric element laminate 14 held therein is screwed to the valve housing 13 on the side opposite to the pump chamber 6. The piezoelectric element laminate 14 expands and contracts in the axial direction according to the magnitude of the voltage applied thereto. The laminate 14 has a columnar shape formed by laminating scores of thin disc-shaped piezoelectric elements (about 0.5 mm in thickness). Each piezoelectric element is composed of, for example, a ceramic called "PZT", consisting mainly of lead titanate zirconate.

Plate-like insulating members 19 and 20 are attached to both end faces of the piezoelectric element laminate 14, the piston 18 abuts against the outer surface of the left insulating member 20, and a plate spring 22 is arranged on the left side of the piston 18. A peripheral screw portion 151 of the casing 15 is screwed to the screw portion of the valve housing 13. The disc-shaped distance piece 17 is inserted between the casing 15 and the valve housing 13. The distance piece 17 is secured through a knock pin 21 in such a manner that the distance piece 17 is not rotated relative to the casing 15, and a hole 171 is formed in the central portion of the distance piece 17 for connecting a pressure chamber 153 formed between the distance piece 17 and the piston 18 to the cylinder bore 133.

One end of the plate spring 22 is engaged with the distance piece 17 and the other end is engaged with the piston 18 to bias the piston 18 toward the piezoelectric element laminate 14 and cause the insulating member 19 to abut against the right end of the casing 15.

The piezoelectric element laminate 14 is connected to a computer 25 through lead lines 241 and 242, and a voltage is applied to the laminate 14 according to instructions of the computer 25. The computer 25 actuates the piezoelectric element laminate 14 at an appropriate timing during an appropriate period according to an accelerator opening degree signal and a pump rotation speed signal.

The accelerator opening degree signal is input to the computer 25 from a potentiometer 261 mounted on a supporting shaft of an accelerator pedal 26, and the pump rotation speed signal is input to the computer 25 from two magnetic resistance element (MRE) sensors 27 and 28 mounted on the pump casing 11. The sensors 27 and 28 are arranged to detect convexities and concavities formed on a disc 29 secured integrally to the driving shaft 2. Namely, the sensor 28 detects convexities and concavities formed at intervals of 5° on the peripheral face of the disc 29 and the sensor 27 detects one projection 291 formed in the vicinity of the periphery of the disc 29. As in the known conventional technique, the phase of the engine and the rotation speed of the pump are determined from the output signals of these sensors 27 and 28.

A voltage is thus applied to the piezoelectric element laminate 14 through the computer 25 and the laminate 14 expands and contracts within the bore 152 of the casing 15 to reciprocatively move the piston 18. When the piezoelectric element laminate 14 expands, the piston 18 moves to contract the volume of the pressure chamber 153 against the plate spring 22, and when the electro-strictive element laminate 14 contracts, the piston 18, under pressure from the plate spring 22, is moved to the right to expand the volume of the pressure chamber 153. When the pressure within the pressure chamber 153 is changed by this expansion and contraction of the pressure chamber 153, this pressure is transmitted to the valve body 16 through a hole 171.

The fuel in a fuel tank 31 is supplied into the low pressure chamber 111 of the pump casing 11 through a fuel feed pump 30.

The operation of the apparatus of the present invention having the above-mentioned structure will now be described.

Where no voltage is applied to the piezoelectric element laminate 14 and hence, the pressure in the pressure chamber 153 is relatively low and the valve body 16 is urged by the spring 23 to abut against the distance piece 17, that is, where the high-pressure fuel passage 131 is connected to the low-pressure fuel passage 132 through the annular grooves 163 and 137, if the suction port 102 is then in communication with the suction passage 8, the fuel supplied to the low pressure chamber 111 from the fuel tank 31 by the feed pump 30 is recycled through the following course: suction passage 8→suction port 102→pump chamber 6→high-pressure fuel passage 131→annular groove 163 of the valve body 16→annular groove 137 of the valve housing 13→low-pressure fuel passage 132→passage 112→low pressure chamber 111. If the suction port 102 does not communicate with the suction passage 8, the fuel in the low pressure chamber 111 flows through the following course: passage 112→low-pressure fuel passage 132→annular groove 137 of the valve housing 13→annular groove 163 of the valve body 16→high-pressure fuel passage 131, and flows into the pump chamber 6. At this point, the fuel which has flowed into the passage 112 from the low pressure chamber 111 passes through the axial passage 168 of the valve body 16 from the passage 136 and also flows into the pressure chamber 153 through the throttle 167, the concave portion 166, and the hole 171. Note, the pressure of the supplied fuel is about 10 atmospheres at highest and the fuel pressure is adjusted by a pressure-adjusting valve or throttle not shown in the drawings.

When the plunger 1 is advanced in this state, the fuel in the pump chamber 6 flows from the high-pressure fuel passage 131 to the low-pressure fuel passage 132 through the annular grooves 163 and 137 and is circulated to the low pressure chamber 111 through the passage 112. Namely, the fuel ejected from the pump chamber 6 is relieved to the low pressure side including the low pressure chamber 111.

If the piezoelectric element laminate 14 is actuated while the fuel is thus relieved, the laminate 14 is elongated by about 50μ in the axial direction, and the piston 18 is moved to the left against the plate spring 22 by a distance corresponding to this elongation. This movement of the piston 18 causes a rise in the pressure of the fuel within the pressure chamber 153, and the fuel is forced into the passage 168 of the axial portion of the valve body 16 through the hole 171 and the throttle 167. The pressure difference produced before and after the valve body 16 by the throttle 167 is larger than the elastic force of the spring 23, and hence, the valve body 16 is moved to the left to cause the first seat portion 164 to adhere closely to the seat surface 135, whereby the high-pressure fuel passage 131 is disconnected from the low-pressure fuel passage 132. Once the first seat portion 164 adheres closely to the seat surface 135, the pressure-receiving area of the large-diameter portion 161 of the valve body 16 becomes larger than that of the small-diameter portion 162, and therefore, the force pressing the valve body 16 to the left is larger and the valve body 16 is held at this position. In this state, the fuel ejected from the pump chamber 6 is fed under pressure to the injection valve 10 through the distribution port 101 and distribution passage 7.

If the piezoelectric element laminate 14 is de-energized in this state or a negative voltage is applied thereto, the laminate 14 contracts in the axial direction, and therefore, the piston 18 is moved to the right under pressure from the plate spring 22. Accordingly, the pressure chamber 153 expands and the fuel in the passage 168 of the axial portion of the valve body 16 flows into the pressure chamber 153 through the throttle 167 and the hole 171. Therefore, a pressure difference is produced before and after the throttle 167, the force pressing the valve body 16 to the right is relatively increased, and the valve body 16 is moved to the right by the combined elastic force of the spring 23 and the hydraulic pressure and seated on the distance piece 17. As the result, the first seat portion 164 separates from the seat surface 135, the high-pressure fuel passage 131 communicates with the low-pressure fuel passage 132, and the fuel ejected from the pump chamber 6 is relieved to the low pressure side.

Figure 2:
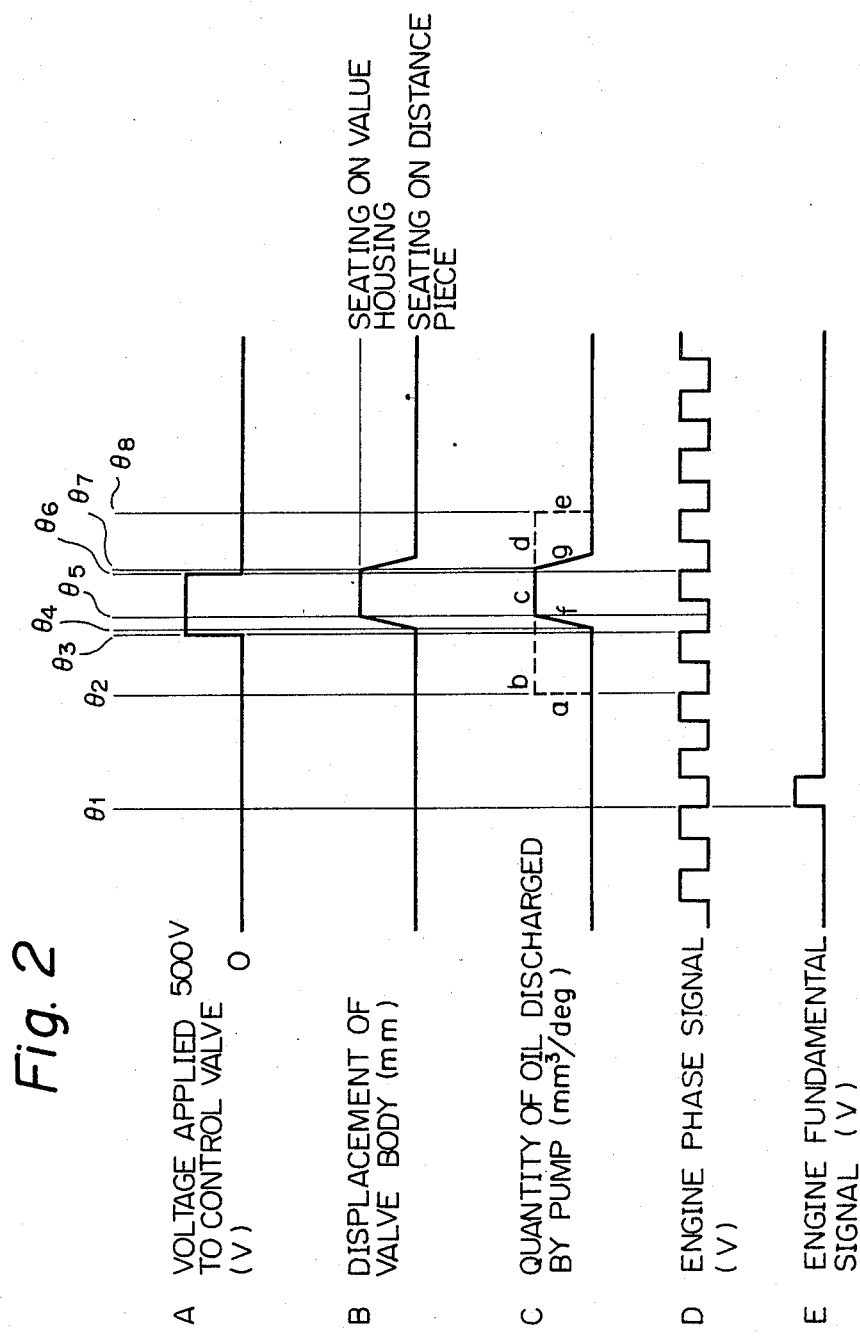
FIG. 2 is a graph showing the operation in the first embodiment.

The foregoing operation will now be described with reference to FIG. 2. In FIG. 2, the time is plotted on the abscissa, and the actuation state, the displacement of the valve body 16, the quantity of the fuel fed to the injection valve 10 of the fuel injection pump of the present embodiment, the engine phase signal obtained from the sensor 28, and the engine standard signal obtained from the sensor 27 are indicated by A, B, C, D and E, respectively.

Referring to FIG. 2, the injection pump can eject the fuel in the sequence a→b→c→d→e, as shown by C, at the engine phases $\theta 2$ through $\theta 8$ elapsing by predetermined phases from the engine phase $\theta 1$. During this period, the plunger 1 is advanced to compress the pump chamber 6. Accordingly, at the phase $\theta 3$ during this period ($\theta 2$ through $\theta 8$), if a voltage of +500 V is applied to the piezoelectric element laminate 14, as shown by A, the pressure chamber 153 is compressed by elongation of the laminate 14 to displace the valve body 16 to the left. As shown by B, this displacement of the valve body 16 starts at the phase $\theta 4$ slightly delayed from the phase $\theta 3$, and at the phase $\theta 5$, the first seat portion 164 is seated on the seat surface 135 and the valve 16 comes to a standstill. By this displacement of the valve body 16, the high-pressure fuel passage 131 is disconnected from the low-pressure fuel passage 132, and the fuel in the pump chamber 6 is fed under pressure from the distribution port 106 to the injection valve 10 through the distribution passage 112 and is ejected from the valve 10. As shown by C, the change of the quantity of the fuel fed under pressure at this time is substantially the same as the displacement of the valve body 16.

Then, at the phase $\theta 6$, if actuation of the piezoelectric element laminate 14 is stopped or a negative voltage is applied to the laminate 14, the laminate 14 contracts to its original length, the pressure in the pressure chamber 153 is reduced, and the valve body 16 is displaced to the right. As in the above-mentioned case, this displacement of the valve body 16 starts with a certain phase delay from the point of actuation stoppage. Namely, the displacement of the valve body 16 starts at the phase $\theta 7$ and the valve body 16 comes to a standstill again at the position where the second seat portion 165 abuts against the distance piece 17. Accordingly, the high-pressure fuel passage 131 communicates with the low-pressure fuel passage 132, and the fuel in the pump chamber 6 is relieved to the low pressure side. More specifically, as shown by C, the quantity of the fuel fed under pressure from the pump chamber 6 is decreased along the line g and the change of the quantity of the fuel is substantially the same as the displacement of the valve body 16.

As is apparent from the foregoing description, as shown by C, the amount of fuel ejected from the pump chamber 6 to the injection valve 10 is changed in the sequence f→c→g, and the area of the portion surrounded by the lines f, c and g in the graph C indicates the quantity of fuel injected from the present injection pump.

In the foregoing embodiment, the timing for starting the injection of the fuel and the timing for terminating the injection of the fuel are controlled during the pump fuel-feeding period, but there may be adopted a modification in which only one of these timings is controlled during this period.

Moreover, it is possible to inject the fuel at least two times during the pump fuel-feeding period, and hence, pilot injection is possible.

As is apparent from the foregoing description, in the present embodiment, the valve body 16 is driven in response to expansion and contraction of the piezoelectric element laminate 14, whereby the high-pressure fuel passage 131 and low-pressure fuel passage 132 are connected or disconnected. Accordingly, the size of the control valve can be diminished and the response characteristic can be improved. Moreover, the timings for starting and terminating the injection of the fuel can be controlled and pilot injection can be performed.

Figure 3:
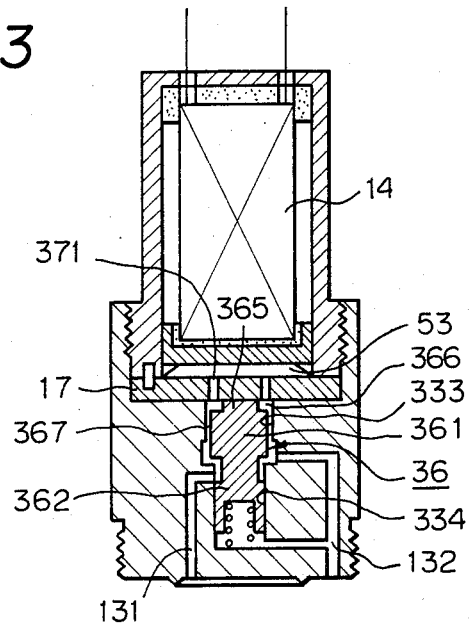
FIG. 3 is a sectional view showing a second embodiment of the present invention.

FIG. 3 shows the second embodiment of the control valve according to the present invention. This embodiment is different from the above-mentioned first embodiment in that the passage piercing through the axis of the valve body 36 is not formed, the outer diameter of the large-diameter portion 361 is slightly smaller than the inner diameter of the first cylinder bore 333, and a clearance 367 is formed between the large-diameter portion 361 and the first cylinder bore 333. Namely, this clearance 367 exerts the same function as that of the throttle 167 in the first embodiment, and when the pressure in the pressure chamber 153 is changed, a pressure difference is produced before and after this clearance 367 and the valve body 36 is displaced according to this pressure difference.

The central part of the end face of the valve body 36 on the side of the distance piece 17 is projected to form a second seat portion 365, and a notch 366 is formed on the periphery of this second seat portion 365. This notch 366 is always in communication with the pressure chamber 153 through one or more holes 371 formed on the distance piece 17.

The pressure-receiving area of the large-diameter portion 361 when the second seat portion of the valve body 36 abuts against the distance piece 17, that is, the sectional area of the end face of the valve body 36 on the side more peripheral then the second seat portion 365, is smaller than the pressure-receiving area of the small-diameter portion 362, and when the second seat portion 365 separates from the distance piece 17, the pressure-receiving area of the large-diameter portion 361 is larger than the pressure-receiving area of the small-diameter portion 362.

In the second embodiment having the above-mentioned structure, when the piezoelectric element laminate 14 is not actuated, the valve body 36 connects the high-pressure fuel passage 131 and the low-pressure fuel passage 132 to each other, and when a voltage is applied to the piezoelectric element laminate 14, the valve body 36 disconnects both passages 131 and 132. The operation is the same as in the above-mentioned first embodiment.

Figure 4:
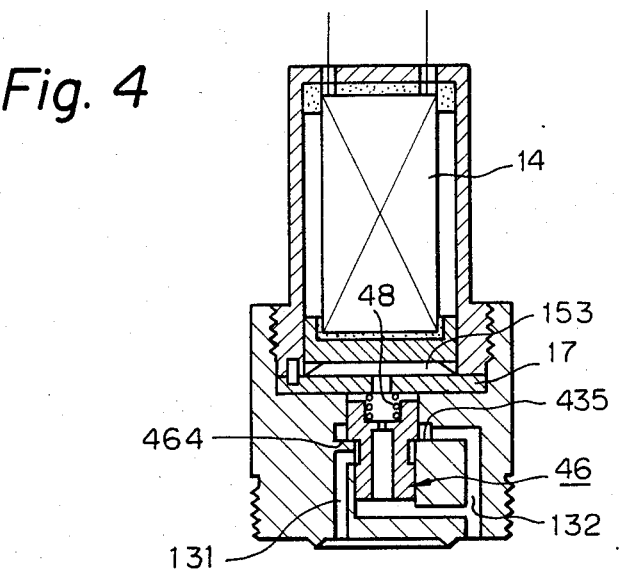
FIG. 4 is a sectional view showing a third embodiment of the present invention.

FIG. 4 shows the third embodiment of the present invention. In this third embodiment, a spring 48 biasing the valve body 46 in one direction is arranged between the distance piece 17 and the valve body 46. More specifically, when a positive voltage is applied to the piezoelectric element laminate 14, the valve body 46 sets the first seat portion 464 on the seat surface 435 to disconnect the high-pressure fuel passage 131 from the low-pressure fuel passage 132. Conversely, when a negative voltage is applied to the piezoelectric element laminate 14, the laminate 14 contracts to reduce the pressure in the pressure chamber 153, whereby the valve body 46 is elevated to separate the first seat portion 464 from the seat surface 435 and connect both passages 131 and 132. Accordingly, the relationship between application of the voltage in the piezoelectric element laminate 14 and connection or disconnection of both passages 131 and 132 in the third embodiment is contrary to the same relationship given in the first and second embodiments. The structure in which the passages 131 and 132 are disconnected from each other with the aid of the spring 48, as in the third embodiment, is known as a "normal closed type" structure. Conversely, the structure in which the spring biases the valve body in such a manner that the passages 131 and 132 communicate with each other as in the first and second embodiments is known as a "normal open type" structure.

Figure 5:
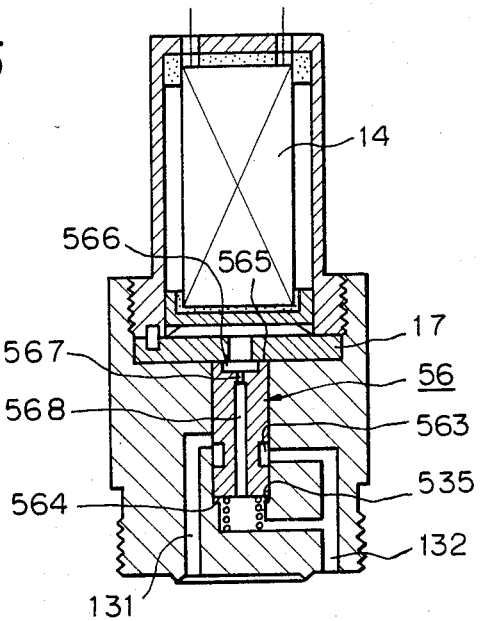
FIG. 5 is a sectional view showing a fourth embodiment of the present invention.

FIG. 5 shows the fourth embodiment of the present invention. This fourth embodiment is different from the above-mentioned first, second, and third embodiments in that the outer diameter of the valve body 56 is constant and the annular groove 563 and the large-diameter portion and the small-diameter portion are not formed. Accordingly, the first seat portion 564 of the valve body 56 is formed on the lower end face while the seat surface 535 is located on the lower step portion of the cylinder bore. A passage 568 is formed through the axial portion of the valve body 56, and a throttle 567 is arranged midway in the passage 568. A concave portion 566 is formed at the central part of the end face of the valve body 56 on the side of the distance piece 17, and the periphery of the concave portion 566 forms a second seat portion 565 capable of abutting against the distance piece 17. When the second seat portion 565 abuts against the distance piece 17, the high-pressure fuel passage 131 communicates with the low-pressure fuel passage 132, and when the first seat portion 564 is set on the seat surface 535, the annular groove 563 is disconnected from the high-pressure fuel passage 131. Accordingly, in the non-actuated state, both the passages 131 and 132 communicate with each other, and when a voltage is applied to the piezoelectric element laminate 14, the valve body 56 is brought down to disconnect both the passages 131 and 132. Accordingly, this fourth embodiment is of the normal open type, and the operation is the same as in the above-mentioned first embodiment.

Figure 6:
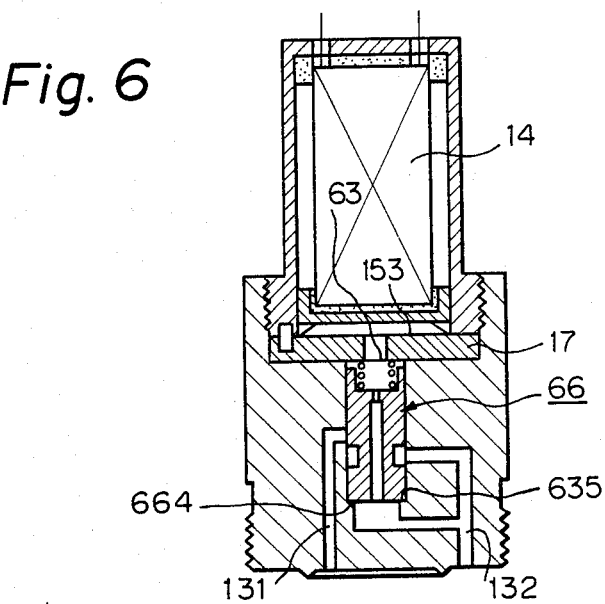
FIG. 6 is a sectional view showing a fifth embodiment of the present invention.

FIG. 6 shows the fifth embodiment of the present invention. In this fifth embodiment, the structure of the fourth embodiment is changed to the normal closed type by changing the position of the spring biasing the valve body of the fourth embodiment. More specifically, the spring 63 is arranged between the valve body 66 and the distance piece 17, and when a positive voltage is applied to the piezoelectric element laminate 14, the valve body 66 is urged by the spring 63 and the pressure in the pressure chamber 153 to cause the first seat portion 664 to abut against the seat surface 635 and to disconnect the high-pressure fuel passage 131 from the low-pressure fuel passage 132. When a negative voltage is applied to the piezoelectric element laminate 14, the valve body 66 rises against the spring 63 to cause both the passages 131 and 132 to communicate with each other. The other operation is the same as in the above-mentioned first embodiment.

Figure 7:
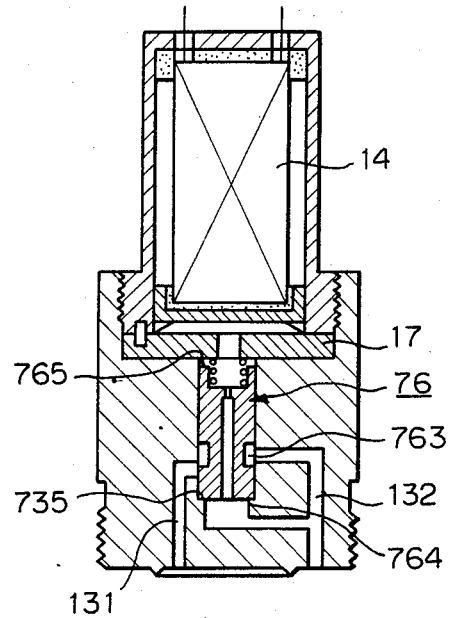
FIG. 7 is a sectional view showing a sixth embodiment of the present invention.

FIG. 7 shows the sixth embodiment of the present invention. This embodiment is different from the fifth embodiment in the opening position of the high-pressure fuel passage 131 to the cylinder bore, and thus is a normal open type structure. More specifically, when the valve body 76 is located at the lower position and the first seat portion 764 abuts against the seat surface 735, the high-pressure fuel passage 131 communicates with the annular groove 763 of the valve body 76, and when the valve body 76 rises and the second seat portion 765 abuts against the distance piece 17, the high-pressure fuel passage 131 is disconnected from the annular groove 763. Accordingly, in the present embodiment, in order to disconnect the passages 131 and 132 from each other, that is, in order to effect injection of the fuel, a negative voltage is applied to the piezoelectric element laminate 14 or the voltage is adjusted to 0 V, and injection of the fuel may be stopped only by applying a positive voltage to the piezoelectric element laminate 14. The state of the application of the voltage to the laminate 14 and the displacement of the valve body 76 in the present embodiment are shown in FIG. 8. When FIG. 8 is compared with FIG. 2, showing the first embodiment, it is seen that the positive and negative of the actuation state of the control valve or the displacement of the valve body in the present embodiment are inverse to those in the first embodiment, but both embodiments are identical in other points. Accordingly, a detailed description of FIG. 8 is omitted.

Figure 9:
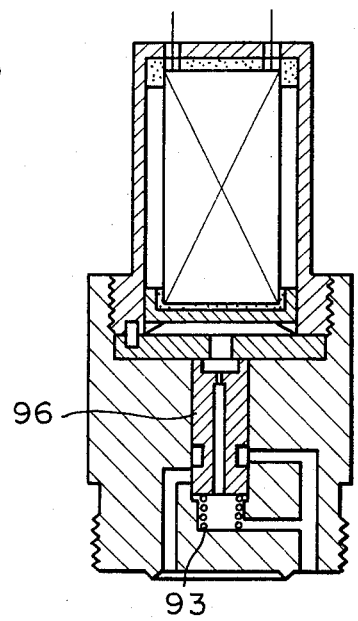
FIG. 9 is a sectional view showing a seventh embodiment of the present invention.

FIG. 9 shows the seventh embodiment of the present invention. This embodiment is different from the above-mentioned sixth embodiment in that the spring is located below the valve body 96. More specifically, the spring 93 is arranged between the valve body 96 and the lower end face of the cylinder bore, and in the non-actuated state, the valve body 96 is pushed upward to disconnect the passages 131 and 132 from each other. Namely, the present embodiment is of the normal closed type.

Figure 10:
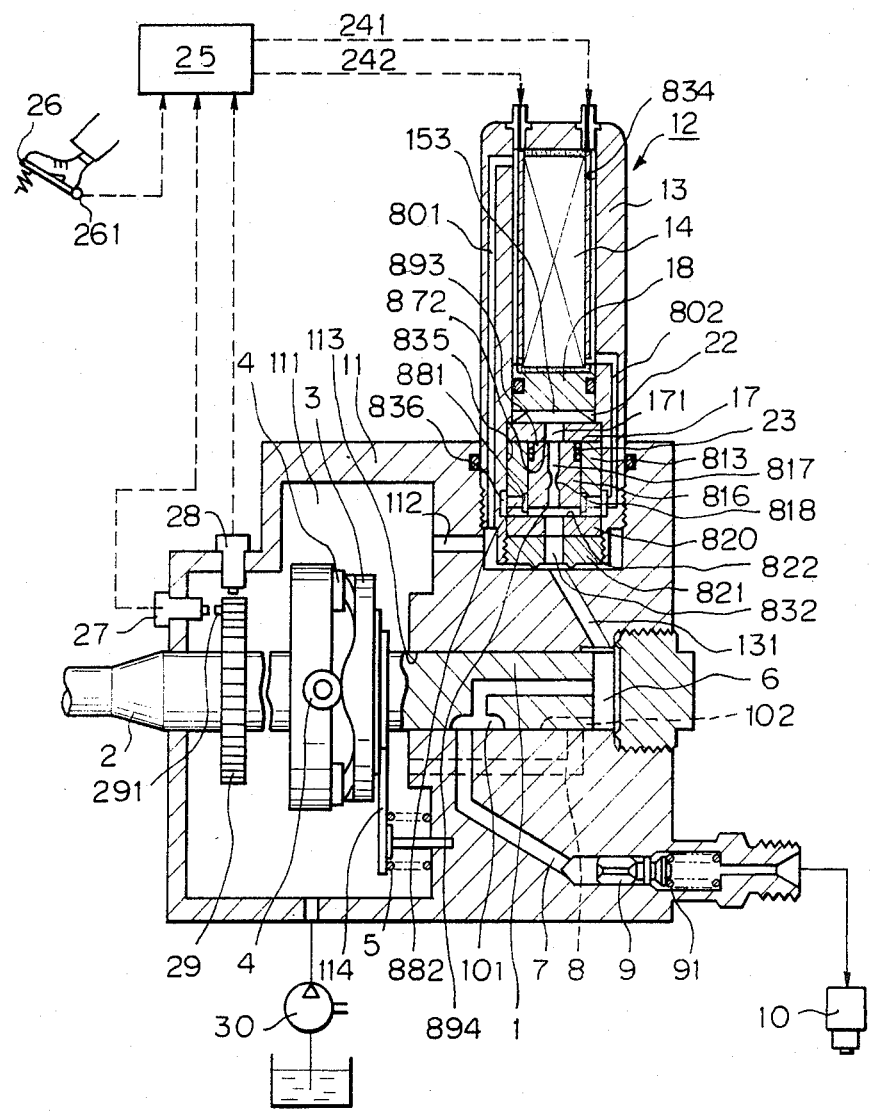
FIG. 10 is a sectional view showing a fuel injection pump to which a control valve of an eighth embodiment of the present invention is adapted.

FIG. 10 shows the eighth embodiment of the present invention. Although this embodiment is of the normal closed type, the valve body 816 is opened in the state shown in FIG. 10. In the present embodiment, the control valve 12 comprises a valve housing 13, a piezoelectric element laminate 14, a piston 18, a plate spring 22, an upper piece 17, a cylinder 813, a valve body 816, a lower piece 820 and a nut 821. In the nut 821 and lower piece 820, there is formed a high pressure passage 832 communicating with a pump chamber 6 through a high-pressure fuel passage 131, and in the valve housing 13, there are formed low-pressure fuel passages 801 and 802 communicating with a low pressure chamber 111 through a passage 112 formed through the pump casing 11 and a cylinder bore to which the low-pressure fuel passages 801 and 802 are opened. This cylinder bore comprises a small-diameter first cylinder bore 834 and a large-diameter second cylinder bore 135. The piezoelectric element laminate 14, the piston 18, and the plate spring 22 are inserted in the small-diameter cylinder bore 834. One end of the low-pressure fuel passage 802 is opened in the vicinity of the piston 18 of the small-diameter cylinder bore 834 in which the piezoelectric element laminate 14 is inserted. The other end of the fuel passage 802 is opened to the annular groove 836 of the large-diameter cylinder bore 835. One end of the other low-pressure fuel passage 801 is opened above the small-diameter cylinder bore 834 and the other end is opened to the outside of the valve housing 13 and communicates with the low pressure chamber 111 through the passage 112.

The upper piece 17, the cylinder 813, and the lower piece 820 are inserted in the large-diameter cylinder bore 835 and are secured by the nut 821.

In the cylinder 813, there are formed an annular groove 881 and four radial passages 882 communicating with the peripheral surface of the cylinder 813 from the annular groove 881.

The valve body 816 is slidably inserted in the cylinder 813. A small hole 817 is formed on the central axis of the valve body 816 and a small-diameter throttle 818 is formed on a part of the small hole 817. The lower end of the small hole 817 is opened to the high pressure passage 832 and the upper end of the small hole 817 is opened to a control passage 171 piercing through the center of the upper piece 17.

The top end face 893 and lower end face 894 of the valve body 816 adhere to the lower end face 872 of the upper piece 17 and the top end face 822 of the lower piece 820, respectively, when the valve 816 is located at the seating position. Ordinarily, the valve body 816 is urged toward the lower piece 820 by the spring 23. In order to ensure the above-mentioned adhesion, the top end face 893 of the valve body 816, the lower end face of the upper piece 17, and the top end face 822 of the lower piece 820 are mirror-polished.

Ordinarily, to use the piezoelectric element laminate 14 composed of PZT as an actuator, a voltage is applied to the PZT from an external power source, and the property of the PZT wherein it expands and contracts according to the voltage applied is utilized.

However, in the present embodiment, as described hereinafter, the external power source need not be used.

This PZT is characterized in that the material characteristics are changed according to the state of the applied voltage. For example, the Young's modulus in the voltage-applied state, that is, in the charge-accumulated state, is different from the Young's modulus in the non-voltage-applied state, that is, in the state where no substantial charge is accumulated. In short, the latter Young's modulus is higher and the PZT in the latter state is softer.

In the present embodiment, this property is utilized for spill control.

When the plunger 1 is moved to the right and the pressure in the pump chamber 6 is elevated, a fuel pressure is applied to the piezoelectric element laminate 14 through the passages 131 and 832, the throttle 818 of the valve body 816, the passage 171, and the pressure chamber 153. A voltage is generated in the piezoelectric element laminate 14 according to this fuel pressure. Namely, charges are generated. If these charges are expelled at the time of termination of the injection, that is, at the spill time, by a short circuit or the like, the material characteristics are abruptly changed as described above. In short, the Young's modulus is increased and the laminate 14 becomes abruptly soft, and therefore, the laminate 14 contracts according to this change of the material characteristics.

When the fuel pressure is 200 kg/cm$^2$, one piezoelectric element contracts by 0.3$\mu$, and thus a laminate comprising 80 piezoelectric elements will contract by about 24$\mu$. When it is intended to elongate the piezoelectric element laminate 14 at a certain timing, charges expelled by the short circuit are accumulated in a capacitor and they are returned to the piezoelectric element laminate 14 at the desired timing, whereby the laminate 14 is elongated. This control is performed by an external controller 25 including a driving circuit 825 (see FIG. 11) through lead lines 241 and 242.

Expansion or contraction of the piezoelectric element laminate 14 is directly transmitted to the piston 18. When the laminate 14 expands, the piston 18 is brought down and the hydraulic pressure in the pressure chamber 153 formed between the piston 18 and the upper piece 17 is abruptly elevated, whereby the valve body 816 is pushed down toward the lower piece 820. As the result, the lower end face 894 of the valve body 816 adheres closely to the upper end face 822 of the lower piece 820. Even if the hydraulic pressure in the pump chamber 6 is made equal to the hydraulic pressure in the pressure chamber 153 through the throttle 818 after this adhesion, the pressure force applied to the upper end face 893 of the valve body 816 is larger than the pressure force applied to the lower end face 894 of the valve body 816 (the pressure force corresponding to the diameter of the center hole of the lower piece 820), and the position of the valve body 816 is maintained.

When the piezoelectric element laminate 14 is caused to contract by the short circuit, the piston 18 is elevated by the plate spring 22, the pressure in the pressure chamber 153 is abruptly reduced, and the valve body 816 is drawn up and adheres closely to the upper piece 17. At this time, the pressure force applied to the lower end face of the valve body 816 is larger than the pressure force applied to the upper end face of the valve body 816, and the position of the valve body 816 is maintained.

When the valve body 816 rises, the pump chamber 6 communicates with the low pressure chamber 111. More specifically, at this point, the state shown in FIG. 10 is produced, and the high-pressure fuel in the pump chamber 6 cools the piezoelectric element laminate 14 through the high-pressure fuel passage 131, the high pressure passage 832, the annular groove 881, the radial passages 882, the annular groove 836, and the low-pressure fuel passage 802, and flows into the low pressure chamber 111 through the low-pressure fuel passage 801 and the passage 112.

When the pump plunger 1 moves to the left and the suction stroke starts, the force of the spring 23 and the reduction of the pressure in the pump chamber 6 causes the valve body 816 to be drawn toward the pump chamber 6 and seated on the lower piece 820, whereby the valve body 816 is closed. Simultaneously, the piezoelectric element laminate 14 expands because the hydraulic pressure in the pressure chamber 153 is reduced.

The driving circuit 825 for the fuel control valve 12 will now be described with reference to FIG. 11.

The piezoelectric element laminate 14 is connected to the driving circuit 825 through lead lines 241 and 242, and the driving circuit 825 is connected to a computer 25 (see FIG. 10). Charges are transmitted between the laminate 14 and a capacitor 248 arranged in series to the laminate 14 through the driving circuit 825 by instructions from the computer 25. The computer 25 outputs trigger signals from thyristors 246 and 247 for transferring charges from the laminate 14 to the capacitor 248 or from the capacitor 248 to the laminate 14 at an appropriate timing according to the accelerator opening degree signals or the rotation speed of the pump. As described hereinbefore with reference to FIG. 1, the accelerator opening degree signal and the pump rotation speed signal are input to the computer 25 from the potentiometer 261 and the sensors 27 and 28.

Accordingly, the piezoelectric element laminate 14 is caused to expand and contract in the valve housing 13 by the computer 25 and the driving circuit 825, to move the piston 18 reciprocatively and effect opening and closing of the valve body 816, whereby the fuel in the pump chamber 6 is ejected from the injection valve 10 or the fuel in the pump chamber 6 is spilled toward the low pressure chamber 111 by communication between the pump chamber 6 and the low pressure chamber 111, to stop ejection of the fuel from the injection valve 10.

Figure 11:
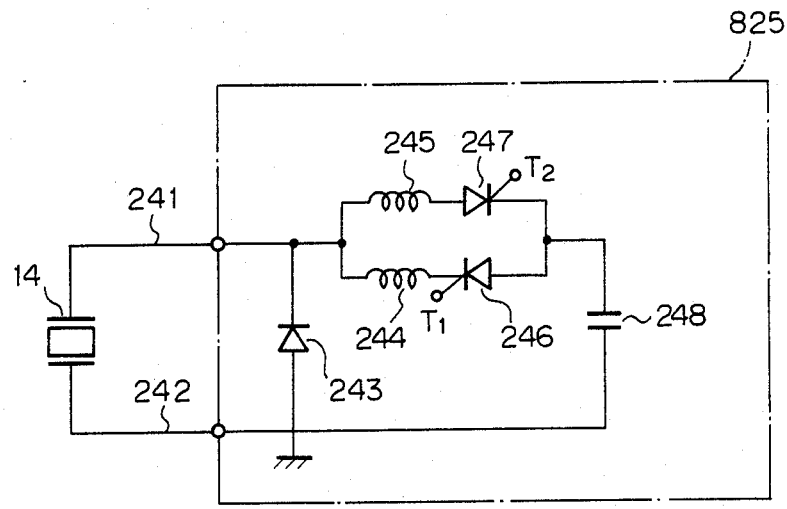
FIG. 11 is a circuit diagram showing a driving circuit for driving the control valve shown in FIG. 10.

In FIG. 11, reference numeral 243 represents a diode for preventing a negative voltage in the piezoelectric element laminate 14, reference numerals 244 and 245 represent resonance coils, and reference numerals 246 and 247 represent thyristors. Reference numeral 248 represents a capacitor. Triggers T1 and T2 of the thyristors 246 and 247 emit signals of the timings of the starting of injection and termination of injection, which are calculated in the computer 25.

The operation of the apparatus of the present embodiment having the above-mentioned structure will now be described.

During the suction stroke of the plunger 1, that is, while the inner pressure in the pump chamber 6 is reduced, the computer 25 outputs a signal from the trigger T1 to the thyristor 246 of the driving circuit 825. If the thyristor 246 is rendered conductive, charges stored in the capacitor 248 are transferred to the piezoelectric element laminate 14 to generate a voltage on both ends of the laminate 14, and the laminate 14 expands according to this voltage, with the result that the piston 18 is brought down, the hydraulic pressure in the pressure chamber 153 is elevated, the valve body 816 is pushed down by this hydraulic pressure and the force of the spring 23, and the control valve 12 is closed. When the plunger 1 enters the compression stroke and the hydraulic pressure in the pump chamber 6 is elevated, injection of the fuel from the injection valve 10 begins.

Because of the presence of the throttle, the pressures above and below the valve body 816 become equal in due course, but since the valve body 816 adheres closely to the lower piece 820, the pressure-receiving area of the upper end face 893 is larger than that of the lower end face 894, and the closed state can be maintained in the valve body 816.

In this state, the hydraulic pressure in the pressure chamber 153 is as high as in the pump chamber 6, the piezoelectric element laminate 14 is compressed through the piston 18, and charges are accumulated in the laminate 14.

At the time of termination of the injection, if a signal from the trigger T2 is input to the thyristor 247 of the driving circuit 825 by the computer 25, charges accumulated in the piezoelectric element laminate 14 are transferred to the capacitor 248. At this point, the material characteristic of the PZT is changed. That is, the Young's modulus is increased and the piezoelectric element laminate 14 is abruptly softened. In the present embodiment, when the capacitor 248 is electrically connected to the piezoelectric element laminate 14 by the thyristor 247 while a hydraulic pressure of about 200 kg/cm$^2$ is applied to the piezoelectric element laminate 14, charges generated in the laminate 14 are expelled by an LC resonance circuit, transferred to the capacitor 248 and stored therein. Accordingly, the laminate 14 falls into the charge-expelled state and contracts by 24 $\mu$m. Consequently, the piston 18 is elevated by the plate spring 22, the fuel pressure in the pressure chamber 153 is abruptly reduced to draw up the valve body 816, and the valve body 816 is opened and abuts against the upper piece 17. Accordingly, the fuel in the pump chamber 6 passes through the high-pressure fuel passage 131, the high pressure passage 832, the annular groove 881, the radial passages 882, the annular groove 881, and the low-pressure fuel passage 802, cools the piezoelectric element laminate 14, and is recycled to the low pressure chamber 111 through the low-pressure fuel passage 801 and the passage 111. Hence, the pressure in the pump chamber 6 is reduced and injection of the fuel from the injection valve 10 is stopped.

Control of the fuel quantity is performed by repeating the above operation.

In the above embodiment, the timing of starting of the injection is set by a timer mechanism of the pump. The trigger T1 from the thyristor 246 may be effected at any point in the suction stroke of the plunger 1.

Figure 12:
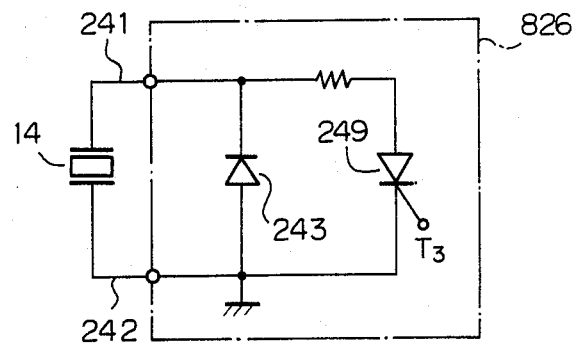
FIG. 12 is a circuit diagram showing another driving circuit for driving the control valve.

The present embodiment is contrived so that when charges in the piezoelectric element laminate 14 are expelled, the charges are transferred to the capacitor 248 by using the LC resonance circuit and are returned to the laminate 14 during the suction stroke. The quantity of charges stored in the laminate 14 is accordingly increased during the compression stroke and the quantity of charges expelled at the spill time is also increased, whereby the contraction quantity is increased. However, there may be adopted a simple modification in which a thyristor 249 is used as in a driving circuit 826 shown in FIG. 12 and charges in the piezoelectric element laminate 14 are expelled by producing a short circuit by the trigger T3 to effect contraction.

As is apparent from the foregoing description, according to the present embodiment, the valve body is driven according to expansion or contraction of the piezoelectric element laminate 14 to effect connection or disconnection between the high-pressure fuel passage and the low-pressure fuel passage, and there can be attained an effect of making control of the injection quantity possible. Furthermore, since the expansion or contraction response of the laminate 14 is very quick, the timing of starting the injection and the injection quantity can be very easily controlled at a high speed. Moreover, since there is provided a driving mechanism including piezoelectric elements, charge-storing means, and switching means, and charges are transmitted between the piezoelectric elements and the charge-storing means, contraction and expansion of the piezoelectric elements can be accomplished without using a high-voltage power source for driving these elements.

Still further, since the piezoelectric element laminate 14 is disposed midway in the low-pressure fluid passage and the periphery of the piezoelectric element laminate 14 is filled with the fluid, heat generated at the time of driving the piezoelectric elements is removed by cooling and the change of the temperature characteristics of the piezoelectric element laminate 14 by heat generation can be controlled.

Figure 13:
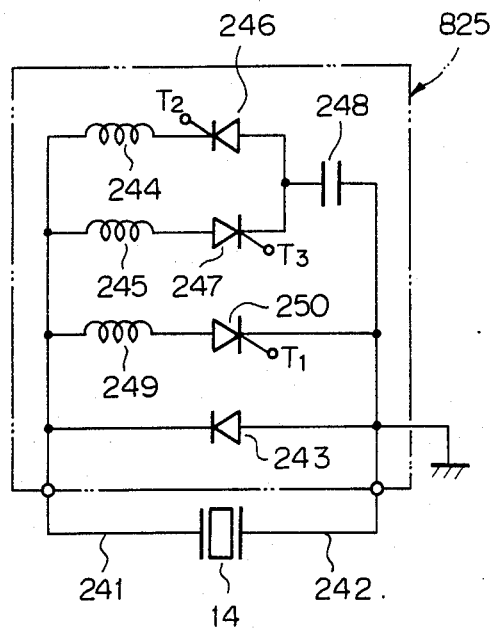
FIG. 13 is a circuit diagram showing still another driving circuit for driving the control valve.

FIG. 13 shows another embodiment of the driving circuit 325. Although pilot injection is difficult by using the driving circuit shown in FIG. 11, pilot injection can be performed very easily by using the driving circuit 325 shown in FIG. 13, as described hereinafter.

The structure of the fuel injection pump is the same as the structure shown in FIG. 10, but in the present embodiment, the displacement stroke of the valve body 816 is limited to 150 $\mu$m. Just after charges of the piezoelectric element laminate 14 are discharged to cause the piezoelectric elements to contract, if charges stored in a charge-storing device (capacitor) described hereinafter are applied to the piezoelectric element laminate 14, the laminate 14 is elongated. Namely, just after initiation of the displacement of the valve body 816 in the valve-opening direction, the valve body 816 is moved again in the valve-closing direction. Accordingly, midway in the elevation of the pressure in the pump chamber 6, the pressure is once reduced, and the pressure is then elevated again. If this timing is skillfully set, injection of the fuel from the injection valve 10 can be temporarily stopped, and according to this method, pilot injection becomes possible. In this case, the stroke of the valve body 816 is about 15$\mu$.

However, the valve body 816 cannot be returned to the original position unless charges larger than charges expelled from the piezoelectric element laminate 14 are applied to the laminate 14. Therefore, charges larger than charges expelled from the piezoelectric element laminate 14 are supplied to the laminate 14 from the charge-storing device.

At the time of termination of injection, the fuel in the pump chamber 6 should be quickly spilled. In the present embodiment, a stroke of 150 $\mu$m is necessary to satisfy this requirement, and hence, the contraction of the piezoelectric element laminate 14 should be as large as possible. In the present embodiment, since charges are applied to the piezoelectric element laminate 14 from the charge-storing device at the time of starting the main injection, these charges are accumulated in the laminate 14. If the pressure in the pump chamber 6 is further elevated by the rightward movement of the plunger 1, the laminate 14 is caused to contract and other charges are accumulated therein. If the charges of the laminate 14 are expelled to the charge-storing device in this state, the laminate 14 abruptly contracts in a large quantity. Accordingly, the valve body 816 is quickly drawn up and attracted to the upper piece 17. Therefore, the fuel in the pump chamber 6 is spilled in the low pressure chamber 111 through the valve body 816, and injection of the fuel from the injection valve 10 is completely stopped. At this point, the force of the pressure received by the lower end face of the valve body 816 becomes larger than the force of the pressure received by the upper end face, and the position of the valve body 816 is maintained.

When the pump plunger 1 enters the suction stroke, the valve body 816 is drawn toward the pump chamber 6 because of reduction of the pressure in the pump chamber 6, and the force of the spring 23 is added to this reduction of the pressure and the valve body 816 is closed. At this point, the piezoelectric element laminate 14 expands according to the reduction of the received pressure.

The structure of the driving circuit 825 will now be described with reference to FIG. 13. The piezoelectric element laminate 14 is connected to the driving circuit 825 through lead lines 241 and 242, and the driving circuit 825 is connected to a controller 25. Through instructions given by the controller 25, the discharge of charges generated in the laminate 14 and the transfer of charges between the laminate 14 and the capacitor 248 as the charge-storing device are effected through the driving circuit 825. The controller 25 outputs a trigger signal (trigger T1) from a thyristor 250 for expelling charges generated in the piezoelectric element laminate 14 and trigger signals (triggers T2 and T3) from thyristors 246 and 247 for transferring charges to the capacitor 248 and transferring charges to the laminate 14 at appropriate timings, according to the accelerator opening degree and the pump rotation speed.

Accordingly, the piezoelectric element laminate 14 is caused to expand and contract in the valve housing by the controller 25 and the driving circuit 825, whereby the piston 18 is moved reciprocatively to advance and retreat the valve body 816, with the result that the fuel in the pump chamber 6 is injected from the injection valve 10 or the pressure in the pump chamber 6 is temporarily reduced to interrupt injection of the fuel from the injection valve 10 and effect pilot injection, or the pump chamber 6 is connected to the low pressure chamber 111 and the fuel in the pump chamber 6 is spilled to stop injection of the fuel from the injection valve 10.

In FIG. 13, reference numeral 243 represents a diode for preventing a negative voltage in the piezoelectric element laminate 14, reference numerals 244, 5, and 249 represent resonance coils, and reference numerals 250, 246, and 247 represent thyristors. Reference numeral 248 represents a capacitor. Signals for the timing of the termination of pilot injection, the timing of starting the main injection, and the timing of termination of the main injection, calculated by the controller 25, are input to triggers T1, T2, and T3 of the thyristors 250, 246, and 247, respectively.

The operation of the apparatus of the present embodiment having the above-mentioned structure will now be described.

Generally, the valve body 816 is closed by the spring 23 and abuts against the lower piece 820, and a so-called normal closed state is produced.

When the plunger 1 enters the compression stroke and the pressure in the pump chamber 6 is elevated, the piezoelectric element laminate 14 is caused to contract by the pressure of the fuel in the pressure chamber 153, charges are generated in the laminate 14, and pilot injection from the injection valve 10 is started. At the time of termination of the pilot injection, the controller 25 emits a trigger signal T1 to the thyristor 250 of the driving circuit 825. When the thyristor 250 is rendered electrically conductive and charges generated in the laminate 14 are discharged, the Young's modulus of the laminate 14 is increased and the laminate 14 is caused to promptly contract by the pressure in the pressure chamber 153. Accordingly, the pressure in the pressure chamber 153 is reduced and the valve body 816 is drawn up by about 15 μm and closed, the pressure in the pump chamber 6 is abruptly reduced, and injection from the injection valve 10 is temporarily stopped. During this period, the plunger 1 continues the rightward movement.

Then, the controller 25 outputs a trigger signal T2 to the thyristor 246 of the driving circuit 825. The thyristor 246 is rendered electrically conductive and a large quantity of charges stored in the capacitor 248 are transferred to the laminate 14, whereby a voltage is produced between both ends of the laminate 14 and the laminate 14 is elongated. Accordingly, the piston 18 is pushed down to increase the hydraulic pressure in the pressure chamber 153, and the valve body 816 is brought down until it adheres closely to the lower piece 820. As the result, the pressure in the pressure chamber 6 is elevated and the main injection from the injection valve 10 is started. Because of the presence of the throttle 192, the pressures above and below the valve body 816 become equal in due course, but since the valve body 816 adheres closely to the lower piece 820, the pressure-receiving area of the upper end face 893 is larger than the pressure-receiving area of the lower and face 894, and thus the closed state is maintained in the valve body 816.

When the plunger 1 is further moved to the right, injection from the injection valve 10 is continued, the pressure in the pump chamber 6 is further elevated, and charges are successively accumulated in the laminate 14.

At the time of termination of main injection, a trigger signal T3 is input to the thyristor 247 of the driving circuit 825 by the controller 25, whereby the thyristor 247 is rendered conductive and a large quantity of charges stored in the piezoelectric element laminate 14 are quickly transferred to the capacitor 248. At this point, the Young's modulus of the laminate 14 is abruptly increased, the piston 18 is raised by the plate spring 22, and the fuel pressure in the pressure chamber 153 is abruptly reduced, whereby the valve body 186 is drawn up by 150 μm and caused to adhere closely to the upper piece 17. Consequently, the fuel in the pump chamber 6 passes through the passages 131, 832, and 802 and arrives at the periphery of the piezoelectric element laminate 14 to cool the laminate 14, and the fuel is then recycled to the low pressure chamber 111 through the passages 801 and 112. Accordingly, the pressure in the pump chamber 6 is reduced and injection from the injection valve 10 is stopped.

The voltage generated according to the quantity of charges in the piezoelectric element laminate 14, the pressure in the pump chamber 6, and the injection rate will now be described.

When a pressure is applied to the piezoelectric element laminate 14, charges are accumulated in the laminate 14, and a voltage is generated according to the accumulated charges. Furthermore, when charges of the capacitor 248 are transferred to the laminate 14, a voltage is generated in the laminate 14. Conversely, when charges accumulated in the piezoelectric element laminate 14 are expelled by the thyristor 250 or transferred to the capacitor 248 by the thyristor 247, the voltage of the laminate 14 is reduced.

Figure 14:
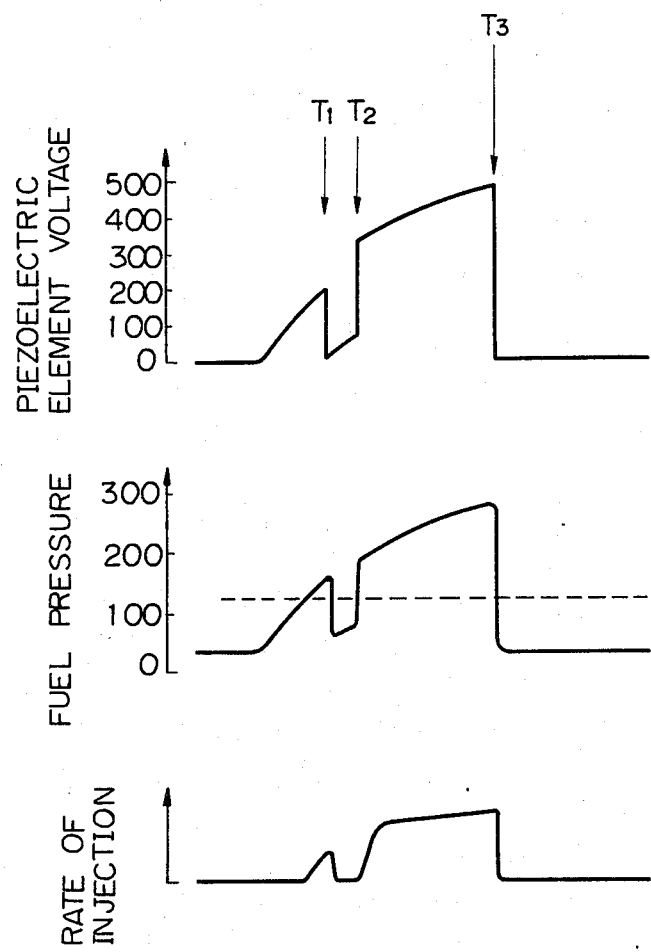
FIG. 14 is a waveform diagram showing the operation in the embodiment having the driving circuit shown in FIG. 13.

This voltage generated between both ends of the piezoelectric element laminate 14 is shown in FIG. 14. FIG. 14 shows the voltage generated between the electrodes of the piezoelectric element laminate 14, the pressure in the pump chamber 6, and the injection rate. The quantity of charges transferred from the capacitor 248 to the laminate 14 by the trigger T2 is larger than the quantity of charges expelled from the laminate 14 by rendering the thyristor 250 conductive by the trigger T1. Accordingly, when charges are supplied to the piezoelectric element laminate 14 by the action of the trigger T2, the laminate 14 expands by a quantity larger than the quantity of contraction of the laminate 14 caused by the action of trigger T1. Therefore, the valve body 816 can be closed again and the main injection can be started.

Theoretically, when the thyristor 247 is rendered conductive by the trigger T3 to transfer charges to the piezoelectric element laminate 14, charges corresponding to 500 V are transferred. At the next cycle, charges of the capacitor 248 are returned to the laminate 14 by the trigger T2. At this point, all the charges should be transferred to the laminate 14 and the voltage should be elevated to 500 V again. Practically, however, there is a loss and the voltage is elevated only to about 300 V. However, since the voltage generated in the piezoelectric element laminate 14 is higher than the 200 V generated at the trigger T1, the valve body 816 can be closed. By repeating the above operation, pilot injection can be performed without using an external power source.

Note, in the present embodiment, pilot injection need not always be carried out throughout the operation, and the present embodiment may be modified so that pilot injection is performed during the low-speed low-load operation, especially during the idle operation, and the main injection is performed only during the high-speed high-load operation.

Note, the present embodiment is contrived so that when the valve body 816 shifts by 15 μm at the time of pilot injection, the annular groove 881 does not communicate with the high pressure passage, by arranging the annular groove 881 above the top end face 822 of the lower piece 820, and the fuel in the pump chamber 6 is not spilled. This is because, if the fuel in the pump chamber 6 is spilled, the pressure in the pump chamber 6 is reduced to the level of the pressure in the low pressure chamber and a long time is required for the pressure to rise to the level for starting the main injection, and thus the response characteristic of the timing for starting the main injection is improved by the above-mentioned contrivance. However, even if there is adopted a structure in which spilling is started simultaneously with the opening of the valve body 816, control of the pilot injection and main injection is possible, and therefore, the valve body 816 and cylinder 813 may be constructed in such a manner that, simultaneously with the opening of the valve body 816, the pump chamber 6 communicates with the low pressure chamber 111.

In the present embodiment, the present invention is applied to control of the hydraulic pressure in the pump chamber of the distribution type pump. The present invention may also be applied to a piezoelectric fuel injection apparatus in which a fuel is directly injected into an engine.

As is apparent from the foregoing description, in the piezoelectric fuel injection control apparatus of the present embodiment, the valve body is driven in response to the expansion and contraction of the piezoelectric element laminate to control the fuel pressure in the pressure chamber, at least at the starting of the injection and the termination of the injection. According to the present embodiment, the pressure of the fuel is applied to the piezoelectric element laminate, charges generated by this application of the pressure are expelled, and the valve body is advanced and retreated by storing these charges in the charge-storing device or returning the charges to the piezoelectric element laminate from the charge-storing device to open and close the fuel passage. Therefore, even without using an external power source necessary for driving a piezoelectric element in the conventional technique, control of the starting of the injection, control of the termination of the injection, and control of the injection rate can be performed.

Since certain changes in carrying out the above embodiments which embody the invention may be made without departing from its scope, it is intended that all matter contained within the above description or shown in the accompanying drawings shall be interpreted as illustrative, and not in a limiting sense.

What is claimed is:

1. A piezoelectric control valve for a fuel injector, which comprises
a housing having formed within a high-pressure fuel passage, a low-pressure fuel passage, and a bore, said high-pressure fuel passage communicating with an external mechanism for ejecting a high-pressure fuel, said low-pressure fuel passage communicating with an external storage portion for holding a low-pressure fuel therein, said passage opening in said bore,
a valve slidably arranged within the bore of the housing to connect the high-pressure fuel passage and the low-pressure fuel passage to each other or to disconnect said fuel passages from each other,
a piezoelectric element laminate which expands and contracts according to the voltage applied and,
a piston which is reciprocatively moved according to the expansion and contraction of the piezoelectric element laminate to change the pressure within a pressure chamber formed between the piston and the valve,
wherein the valve is moved forward and backward according to the pressure difference between pressure-receiving surfaces, on which the pressure within the pressure chamber is applied, to connect the high-pressure fuel passage and the low-pressure fuel passage to each other or to disconnect said fuel passages from each other.

2. A piezoelectric control valve as set forth in claim 1, wherein an annular groove is formed on the peripheral surface of the valve and the high-pressure fuel passage communicates with the low-pressure fuel passage through said annular groove.

3. A piezoelectric control valve as set forth in claim 1, wherein the valve has a first pressure-receiving surface formed on the side of the pressure chamber and a second pressure-receiving surface formed on the side opposite to the pressure chamber.

4. A piezoelectric control valve as set forth in claim 3, wherein the first and second pressure-receiving surfaces are connected through a passage formed through the valve body and a throttle is formed in said passage.

5. A piezoelectric control valve as set forth in claim 3, wherein the first pressure-receiving surface is connected to the second pressure-receiving surface through a clearance formed between the peripheral surface of the valve and the bore.

6. A piezoelectric control valve as set forth in claim 1, wherein when the pressure in the pressure chamber is relatively high, the valve disconnects the high-pressure fuel passage from the low-pressure fuel passage and the position of the valve is thus maintained.

7. A piezoelectric control valve as set forth in claim 1, wherein when the pressure in the pressure chamber is relatively low, the valve connects the high-pressure fuel passage to the low-pressure fuel passage and the position of the valve is thus maintained.

8. A piezoelectric control valve as set forth in claim 1, wherein means for driving the piezoelectric element laminate is provided, and said driving means causes the piezoelectric element laminate to contract by expelling charges generated in the piezoelectric element laminate, whereby the valve is opened to connect the high-pressure fuel passage and the low-pressure fuel passage.

9. A piezoelectric control valve as set forth in claim 8, wherein said driving means includes charge-storing means for storing charges generated in the piezoelectric element laminate and switching means for performing control of storing charges of the piezoelectric element laminate in the charge-storing means and control of supplying charges of the charge-storing means to the piezoelectric element laminate, and the piezoelectric element laminate is caused to contract by storing charges generated in the piezoelectric element laminate into said charge-storing means.

10. A piezoelectric control valve as set forth in claim 9, wherein the charge-storing means is a capacitor and the switching means comprises two thyristors.

11. A piezoelectric control valve as set forth in claim 9, wherein the driving means, first switching means, and second switching means are provided, the first switching means expels charges generated in the piezoelectric element laminate to cause the piezoelectric element laminate to contract and to open the valve body and second switching means supplies charges stored in the charge-storing means to the piezoelectric element laminate to elongate the piezoelectric element laminate and close the valve body, whereby the high-pressure fuel passage is disconnected from the low-pressure fuel passage, and the charges generated in the piezoelectric element laminate are transferred to the charge-storing means and stored therein to cause the piezoelectric element laminate to contract and to open the valve body.

12. A piezoelectric control valve as set forth in claim 11, wherein the fuel pressure is reduced by the first switching means for expelling charges of the piezoelectric element laminate to temporarily stop injection of the fuel, the second switching means supplies charges stored in the charge-storing means to the piezoelectric element laminate to start injection again, and injection of the fuel is terminated by transferring charges generated in the piezoelectric element laminate to the charge-storing means, whereby pilot injection and main injection are performed.

13. A piezoelectric control valve as set forth in claim 12, wherein thyristors are used as the first and second switching means.

14. A piezoelectric control valve as set forth in claim 12, wherein the quantity of charges expelled from the piezoelectric element laminate at the time of termination of pilot injection is smaller that the quantity of charges supplied to the piezoelectric laminate means from the charge-storing means at the time of starting the main injection.

15. A piezoelectric control valve as set forth in claim 11, wherein a capacitor is used as the charge-storing means.

16. A piezoelectric control valve as set forth in claim 8, wherein the driving means includes switching means for expelling charges generated in the piezoelectric element laminate.

17. A piezoelectric control valve as set forth in claim 8, wherein the piezoelectric element laminate is arranged midway in the low-pressure fuel passage and the periphery of the piezoelectric element laminate is filled with the fuel.

* * * * *